US012275249B2

(12) United States Patent
Condie et al.

(10) Patent No.: US 12,275,249 B2
(45) Date of Patent: Apr. 15, 2025

(54) PREDICTIVE INK DELIVERY SYSTEM AND METHODS OF USE

(71) Applicant: Xaar Technology Limited, Huntingdon (GB)

(72) Inventors: Angus Condie, Huntingdon (GB); David Speed, Huntingdon (GB); Renzo Trip, Huntingdon (GB)

(73) Assignee: Xaar Technology Limited, Huntingdon (GB)

( * ) Notice: Subject to any disclaimer, the term of this patent is extended or adjusted under 35 U.S.C. 154(b) by 0 days.

(21) Appl. No.: 17/767,374

(22) PCT Filed: Oct. 7, 2020

(86) PCT No.: PCT/GB2020/052473
§ 371 (c)(1),
(2) Date: Apr. 7, 2022

(87) PCT Pub. No.: WO2021/069885
PCT Pub. Date: Apr. 15, 2021

(65) Prior Publication Data
US 2024/0100842 A1 Mar. 28, 2024

(30) Foreign Application Priority Data
Oct. 8, 2019 (GB) ..................................... 1914512

(51) Int. Cl.
*B41J 2/175* (2006.01)
*B41J 2/045* (2006.01)
(Continued)

(52) U.S. Cl.
CPC ........... *B41J 2/175* (2013.01); *B41J 2/04508* (2013.01); *B41J 2/04586* (2013.01);
(Continued)

(58) Field of Classification Search
CPC ..................................................... B41J 3/4073
See application file for complete search history.

(56) References Cited

U.S. PATENT DOCUMENTS 5,969,735 A 10/1999 Haigo et al.
7,467,858 B2 12/2008 Lebron et al.
(Continued)

FOREIGN PATENT DOCUMENTS

CN 1150776 A 5/1997
CN 101072684 A 11/2007
(Continued)

*Primary Examiner* — Shelby L Fidler
(74) *Attorney, Agent, or Firm* — Honigman LLP; Eric J. Sosenko; Jonathan P. O'Brien

(57) ABSTRACT

A sub-controller (20), controller (30), fluid supply system and apparatus for printing and a method for printing. Provided is a processor controlled sub-controller (20) for controlling the fluid pressure in one or more droplet ejection heads (60); wherein said controller (30) is configured to receive a droplet ejection head movement profile for each of said one or more droplet ejection heads (60), determine a respective induced fluid pressure profile at one or more predetermined locations for each of said one or more droplet ejection heads (60) using the respective droplet ejection head movement profile; and generate respective pressure correction data for each of said one or more droplet ejection heads based on the respective induced fluid pressure profile and a predetermined pressure window to be maintained at said one or more droplet ejection heads (60). Also provided is a method of printing using one or more droplet ejection heads (60) fluidically connected to a fluid supply system wherein said method comprises the steps of receiving droplet ejection head movement profile(s); determining a respective induced fluid pressure profile at one or more predetermined locations for each of said one or more droplet ejection heads using the respective droplet ejection head movement
(Continued)

profile(s); generating respective pressure correction file(s) at said one or more predetermined locations based on said induced fluid pressure profile(s) and said predetermined pressure window.

7 Claims, 11 Drawing Sheets

(51) Int. Cl.
*B41J 3/407* (2006.01)
*B41J 29/393* (2006.01)
*B41M 5/00* (2006.01)

(52) U.S. Cl.
CPC ........... *B41J 3/4073* (2013.01); *B41J 29/393* (2013.01); *B41M 5/0088* (2013.01)

(56) References Cited

U.S. PATENT DOCUMENTS

| | | | |
|---|---|---|---|
| 7,543,922 | B2 | 6/2009 | Kachi |
| 7,841,706 | B2 | 11/2010 | Ishinaga et al. |
| 7,874,656 | B2 | 1/2011 | Ota et al. |
| 10,000,065 | B1 | 6/2018 | Baker et al. |
| 2007/0263244 | A1 | 11/2007 | Sugitani et al. |
| 2009/0322806 | A1 | 12/2009 | Donahue et al. |
| 2015/0042716 | A1 | 2/2015 | Beier et al. |
| 2017/0232733 | A1 | 8/2017 | Rupprecht et al. |
| 2018/0361752 | A1 | 12/2018 | Baker et al. |
| 2020/0269568 | A1* | 8/2020 | Lewis .................. B41J 2/04581 |
| 2020/0316954 | A1* | 10/2020 | Bullington ............... B41J 2/175 |

FOREIGN PATENT DOCUMENTS

| | | | |
|---|---|---|---|
| CN | 106687297 | A | 5/2017 |
| CN | 106853689 | A | 6/2017 |
| DE | 10 2015 205631 | A1 | 6/2015 |
| EP | 2641661 | A1 | 9/2013 |
| EP | 3 415 240 | A1 | 12/2018 |
| JP | 2007130852 | A | 5/2007 |
| JP | 2015-520011 | A | 7/2015 |
| JP | 2017-017413 | A | 1/2017 |
| JP | 2019-001157 | A | 1/2019 |
| WO | 2018/044869 | A1 | 3/2018 |

* cited by examiner

PREDICTIVE INK DELIVERY SYSTEM AND METHODS OF USE

The present disclosure relates to a sub-controller, controller, fluid supply system and apparatus for printing and to a method for printing, which may be particularly suitable for applications where the droplet ejection head is subjected to acceleration/deceleration whilst printing, or where the droplet ejection head is subjected to changes of position, and orientation, possibly in multiple directions and degrees of freedom. Such applications may include printing onto large or complex shapes, such as walls and inclined surfaces, or 3D objects.

BACKGROUND

Droplet ejection heads are now in widespread usage, whether in more traditional applications, such as inkjet printing, or in 3D printing, or other rapid prototyping techniques. Accordingly, the fluids, e.g. inks, may have novel chemical properties to adhere to new substrates and increase the functionality of the deposited material. Droplet ejection heads have been developed that are capable of use in industrial applications, for example for printing directly onto substrates such as ceramic tiles or textiles or to form elements such as colour filters in LCD or OLED displays for flat-screen televisions. Such industrial printing techniques using droplet ejection heads allow for short production runs, customization of products and even printing of bespoke designs. It will therefore be appreciated that droplet ejection heads continue to evolve and specialise so as to be suitable for new and/or increasingly challenging applications. However, while a great many developments have been made in the field of droplet ejection heads, there remains room for improvements.

In most applications, some form of fluid supply system is required to deliver fluid to the droplet ejection heads. The objective of the fluid supply system may be limited to replenishing the fluid ejected by the droplet ejection head; more complex systems may control the temperature, fluid flow rate, pressure at one or more points inside the droplet ejection head, for example the pressure in the nozzles such that the meniscus position is controlled, and more.

To ensure reliable performance of the droplet ejection head, it is desirable to maintain the fluid meniscus within the nozzles of the droplet ejection head so as to prevent fluid weeping onto a nozzle plate; in order to do this, the pressure inside the nozzle(s) of the droplet ejection head is kept below atmospheric pressure. This negative pressure is commonly referred to as back pressure or meniscus pressure. It is also desirable to prevent air being ingested into the droplet ejection head, which occurs when the back pressure is too low, such that the meniscus is drawn back into the droplet ejection head. The back pressure must therefore be kept within a window which is generally determined by: 1) the pressure at which the fluid starts to weep onto the nozzle plate, and/or 2) the pressure at which air is ingested through the nozzles. Further, variation of the back pressure within this window may be sufficient to result in undesirable droplet volume and velocity variations which may lead to observable defects in the printed image on the substrate. Therefore, for reliable and good quality droplet ejection it is often necessary to control the back pressure and keep its variation to a minimum (for example for the Xaar 1003 printhead a range of ±2 mbar is specified). Variations in back pressure may originate from a variety of sources, e.g. variations in print duty, additionally, in scanning applications where the droplet ejection head is moved over the substrate, the acceleration and deceleration of the droplet ejection head may also lead to variations in the back pressure. Fluid supply systems for droplet ejection heads therefore frequently comprise some form of control device or process to respond to and compensate for changes in the back pressure. The control may be active (such as a feedback loop) or passive (pressure attenuators/dampers and the like).

In recent years, there has been increasing interest in printing onto more complex and/or large shapes, such as three-dimensional objects, or surfaces such as walls, or onto objects such as vehicles, either to provide an overall covering, or to decorate and/or customise the surface with images and/or text and/or texture. Traditionally, many of these are coated using techniques such as spray painting, but this can be undesirable due to the release of large numbers of small particles of fluid into the atmosphere, which may be difficult or expensive to deal with so as to prevent environmental damage or harm to operators. Printing onto complex and/or large shapes and surfaces using droplet ejection heads is therefore of interest due to the ability to print onto the surface in a targeted and controlled manner, without release of large numbers of small particles into the atmosphere. Such a technique may also reduce the ink/fluid volume requirements, and therefore the costs. Further, printing techniques may allow the use of multiple colours or fluid types at once, and the printing of complex print jobs in a limited number of passes.

Printing onto large/complex shapes and surfaces may, for example, require the use of industrial robots such as multi-axis machines or a gantry system or robotic arms. The movement of the droplet ejection head in such applications may lead to large and rapid pressure changes, which existing control methods may not be able to compensate for, making it difficult to prevent the droplet ejection head weeping or ingesting air, or causing observable defects in the printed image. It is an object of the present invention to prevent such disadvantages.

FIG. 10*a* depicts printing onto a substrate 81 using a moving droplet ejection head 60 in a scanning application. For the scanning application, the droplet ejection head 60 is moved back and forth in one direction only, whilst the substrate 81 is moved below it in the substrate movement direction 83, which is at right-angles to the droplet ejection head movement direction 84. In operation, the idle droplet ejection head 60 is accelerated to reach a constant print speed before moving over the substrate (FIG. 10*a*(i)) to print a first swath 82(*i*). After completion of the first print swath, the droplet ejection head 60 is decelerated, and then accelerated in the opposite direction to print the next swath 82(*ii*) as shown in FIG. 10*a*(ii). Acceleration and deceleration of the droplet ejection head 60 will induce a pressure change due to the inertial forces acting on the fluid, but the effect is usually limited by performing the acceleration/deceleration in regions outside the print region, e.g. to either side of the substrate 81.

FIG. 10*b* depicts printing onto a three-dimensional (3D) object 80 using a moving droplet ejection head 60. As for the scanning application depicted in FIG. 10*a*, the droplet ejection head 60 is accelerated and decelerated to obtain the correct location and speed at various parts of the object 80. In addition, the orientation of the droplet ejection head 60 will have to change in order to keep the droplets directed towards the surface of the object 80. However, unlike the scanning application, such changes of velocity and orientation cannot be confined to a region that is not to be printed upon, and the pressure changes that are induced need to be compensated for while printing in order to maintain the meniscus within a desired range of positions within the nozzle. In order to do this, the back pressure needs to be controlled, as discussed above.

FIGS. 11*a-c* depict a droplet ejection head 60 at three different positions to explain how a change in the orientation of the droplet ejection head 60 will change the height of the fluid column Δh that is acting on the fluid at the nozzle plate 61 of the droplet ejection head 60 and consequently change the induced pressure 170 (ΔP). In FIGS. 11*a* and 11*b*, the droplet ejection head 60 is rigidly fixed to the sensor/controller 50/10, whilst in FIG. 11*c*, the droplet ejection head 60 is able to rotate with respect to the sensor/controller 50/10 and to move along a curved path 160. The height difference Δh3 in FIG. 11*c* is shown for a given time instance as the droplet ejection head 60 moves along the curved path 160.

$\Delta P = \mu g \Delta h$, where ρ is the density of the fluid (typically approximately 1000 $kg/m^3$) and Δh is the height of the fluid column between the nozzle plate 61 and the predetermined location 51 on the sensor/controller 50/10. If the gravitational acceleration, g, is taken to be 10 $m/s^2$, then:

| FIG. | Δh (m) | ΔP (mbar) |
|---|---|---|
| 11a | 0.1 | 10 |
| 11b | 0 | 0 |
| 11c | 0.07 | 7 |

It may therefore be understood from the above that a print strategy that involves moving one or more droplet ejection heads 60 so as to address a three-dimensional object, or a surface that is not horizontal, may lead to induced pressure changes as the height of the fluid column Δh varies; and that this will cause changes in the back pressure and potentially lead to the meniscus moving outside its desired positional range within the nozzle. It is known to actively control the back pressure; for example in gravity fed systems, the level of the fluid in a reservoir can be adjusted so as to control the height of a fluid column Δh which is measured between the fluid level in the reservoir and the nozzle plate 61. In other systems, such as those shown in FIGS. 11*a-c*, the height of the fluid column Δh which is of importance, is the height between the nozzle plate 61 and the predetermined location 51 where a control device 10 is located (as shown in FIGS. 11*a-c*). The pressure can be measured at the predetermined location 51 and adjusted using the control device 10 so as to maintain the back pressure in the desired range. However, where the droplet ejection head 60 is accelerating/decelerating rapidly, or has changes of orientation or direction, adjusting the back pressure in response to the measured pressure changes can be too slow, leading to, at best, undesirable variation in droplet ejection performance which can lead to observable defects in the printed image on the object/substrate, or at worst to weeping or air ingestion, the latter of which can lead to nozzle failure if the air cannot be cleared from the droplet ejection head. The present invention aims to provide a more effective pressure prediction and to provide more effective pressure control by using pressure prediction, so as to obviate the above-described defects, and a fluid supply system, controller and apparatus to implement said pressure prediction in a correction method.

SUMMARY

Aspects of the invention are set out in the appended independent claims, while details of particular embodiments of the invention are set out in the appended dependent claims.

According to a first aspect of the disclosure there is provided a processor controlled sub-controller for controlling the fluid pressure in one or more droplet ejection heads; wherein the sub-controller is configured to:

- receive a droplet ejection head movement profile for each of said one or more droplet ejection heads;
- determine a respective induced fluid pressure profile at one or more predetermined locations for each of said one or more droplet ejection heads using the respective droplet ejection head movement profile; and
- generate respective pressure correction data for each of said one or more droplet ejection heads based on the respective induced fluid pressure profile and a predetermined pressure window to be maintained at said one or more droplet ejection heads.

According to a second aspect of the disclosure there is provided a processor controlled controller configured to control a printing process comprising controlling the fluid pressure in one or more droplet ejection heads; wherein the controller is configured to:

- receive a printing strategy; and
- calculate a respective droplet ejection head movement profile for each of said one or more droplet ejection heads using said printing strategy.

According to certain embodiments there is provided a controller according to the second aspect further configured to send one or more droplet ejection head movement files to a sub-controller according to the first aspect.

According to certain other embodiments there is provided a controller according to the second aspect further configured to incorporate the functionality of a sub-controller according to the first aspect.

According to a third aspect of the disclosure there is provided a fluid supply system comprising a fluid supply and a sub-controller according to the first aspect and/or a controller according to the second aspect; wherein the fluid supply comprises a fluid reservoir and one or more fluid supply paths, wherein said one or more fluid supply paths are connected to said fluid supply at a first end and are configured so as to connect to one or more droplet ejection heads at a second end.

According to certain embodiments there is provided a fluid supply system according to the third aspect, wherein said fluid supply system further comprises one or more control devices located at one or more predetermined locations and wherein said one or more control devices are in communication with a sub-controller according to the first aspect and/or a controller according to the second aspect.

According to certain embodiments there is provided a fluid supply system according to the third aspect further comprising one or more pressure sensors located so as to measure the pressure at the one or more predetermined locations and in communication with a sub-controller according to the first aspect and/or a controller according to the second aspect so as to provide pressure measurements thereto.

According to a fourth aspect of the disclosure there is provided an apparatus comprising a fluid supply system according to the third aspect; said apparatus further comprising one or more droplet ejection heads fluidically connected to said fluid supply system at said second end of said one or more fluid supply paths and one or more movement devices wherein said movement devices are configured to mount one or more of said one or more droplet ejection heads thereupon.

According to a fifth aspect of the disclosure there is provided a method for printing using one or more droplet ejection heads fluidically connected to a fluid supply system according to the third aspect, or an apparatus according to the fourth aspect; wherein said method comprises the steps of:

receiving a droplet ejection head movement profile;

determining a respective induced fluid pressure profile at one or more predetermined locations for each of said one or more droplet ejection heads using the respective droplet ejection head movement profile;

generating pressure correction data at said one or more predetermined locations based on said induced fluid pressure profile and said predetermined pressure window; and generating pressure correction file(s) for said one or more predetermined locations based on said pressure correction data.

According to an embodiment, generating said pressure correction file(s) may further comprise adjusting for further predictable pressure variations in said fluid supply system.

Alternatively, or in addition, said method may further comprise adjusting the pressure in the fluid supply system if there is a difference between a sensed pressure and the predetermined pressure window.

Figure 1:
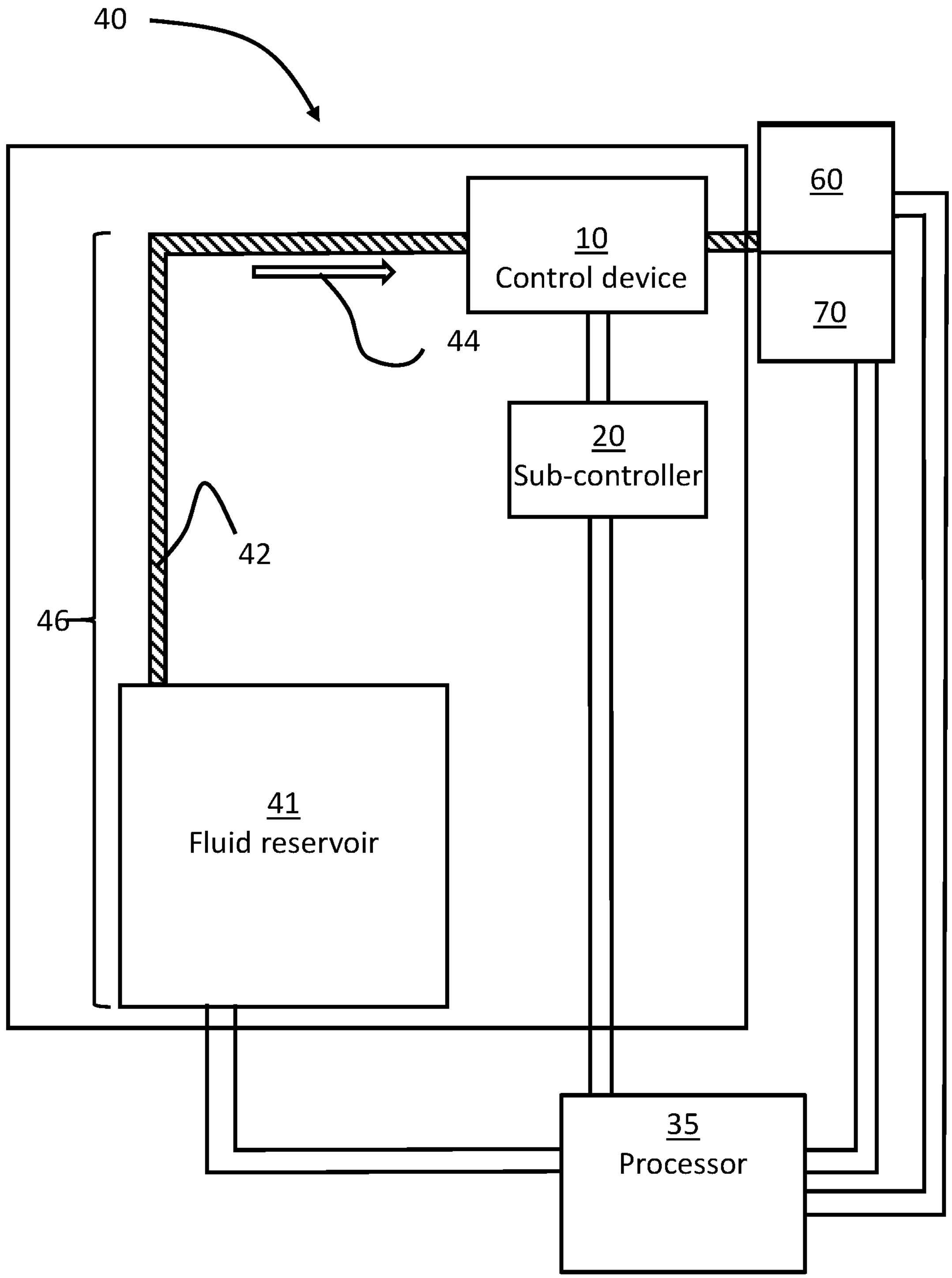
FIG. 1 depicts a processor, a fluid supply system, a movement device and a droplet ejection head wherein said fluid supply system comprises a fluid supply, a sub-controller that is controlled by the processor, and a control device.

It should be noted that the drawings are not to scale and that certain features may be shown with exaggerated sizes so that these are more clearly visible.

DETAILED DESCRIPTION OF THE DRAWINGS

Embodiments and their various implementations will now be described with reference to the drawings. Throughout the following description, like reference numerals are used for like elements where appropriate.

FIG. 1 depicts a processor 35, a fluid supply system 40, a movement device 70 and a droplet ejection head 60 mounted on the movement device 70; wherein the fluid supply system 40 comprises a fluid supply 46, a sub-controller 20 that is controlled by the processor 35, and a control device 10. The fluid supply 46 comprises a fluid reservoir 41 and a fluid supply path 42; a first end of the fluid supply path 42 is connected to the fluid reservoir 41 and a second end of the fluid supply path 42 is configured so as to connect to the droplet ejection head 60 so that in operation the fluid supply 46 delivers fluid (such as ink) from the fluid reservoir 41 to the droplet ejection head 60 via the fluid supply path 42, as indicated by the arrow 44. It may be understood that in other arrangements, the fluid supply may comprise further components, as required for operation of the fluid supply, such as pumps, dampers, flow meters, flow regulators, additional intermediate reservoirs, valves, heaters/coolers, temperature sensors, degassers and the like. The processor 35 is configured to control the sub-controller 20, the droplet ejection head 60, the movement device 70 and the fluid reservoir 41 and, where present, any constituent parts thereof such as pumps, flow regulators, etc. The processor 35 may also comprise means for an operator to interface with it and adjust the printing process, for example the processor 35 may be a personal computer, or any other suitable apparatus.

The control device 10 is part of the fluid supply system located in or adjacent to the fluid supply path 42 so as to be fluidically connected to the fluid supply path 42 so as to be able to control the pressure in the fluid supply 46. In this implementation, the control device 10 is located in close proximity to the droplet ejection head 60. The sub-controller 20 is configured so as to control the control device 10. The sub-controller may be a system-on-chip module. The sub-controller may comprise software elements and/or FPGA logic.

Figure 2A:
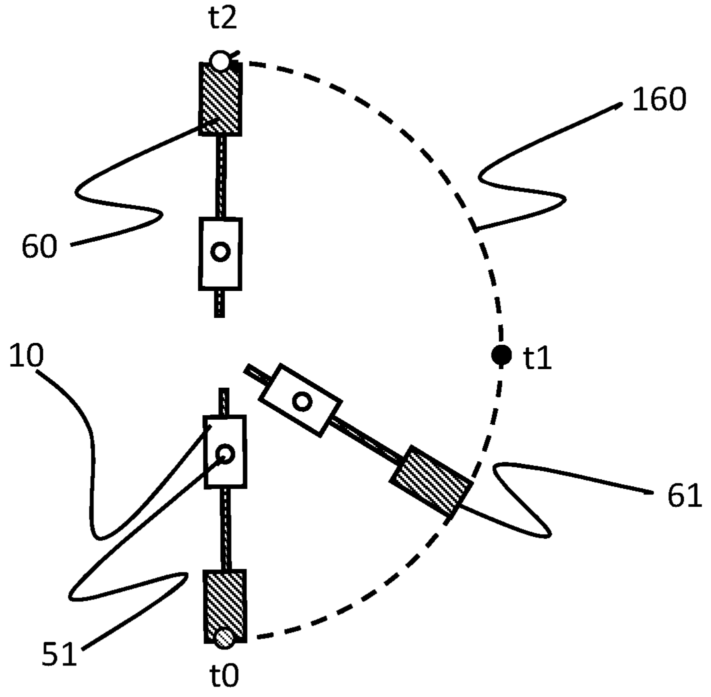
FIG. 2*a* depicts a droplet ejection head and sensor/controller moving together in a semi-circular path.
Figure 2B:
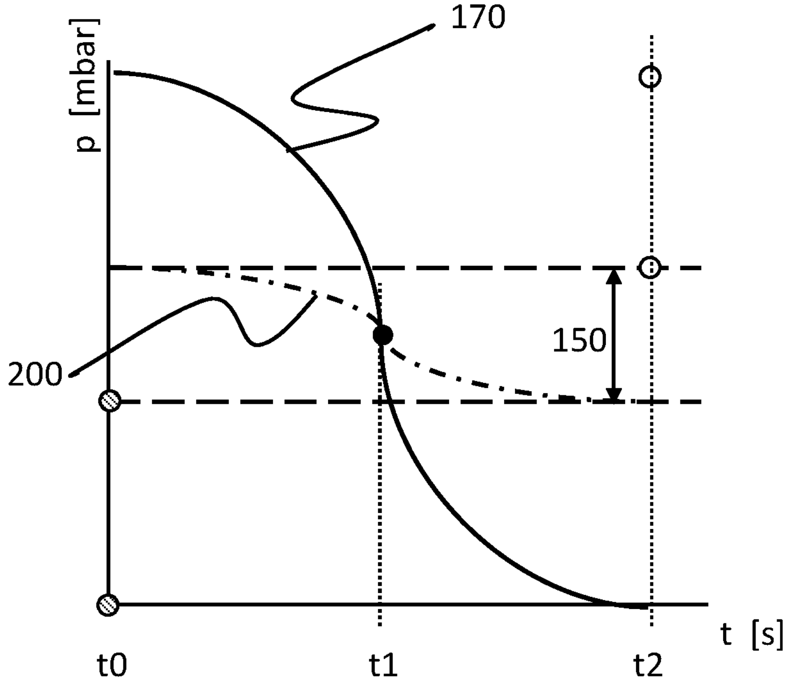
FIG. 2*b* is a representative diagram of an induced pressure profile and a pressure adjustment profile for the droplet ejection head and sensor/controller of FIG. 2*a;*

Turning now to FIG. 2*a*, this depicts a droplet ejection head 60 and a control device 10 moving together such that a movement profile may be derived from (for example calculated based on) the semi-circular path 160 tracked by the droplet ejection head 60. FIG. 2*b* is a schematic depiction of how the predicted induced fluid pressure profile 170 might vary as the height of the fluid column Δh between the nozzle plate 61 and the predetermined location 51 varies with time as the droplet ejection head 60 in FIG. 2*a* moves along the semi-circular path 160. FIG. 2*b* also depicts a representation of the corrected pressure profile 200 where the induced pressure profile 170 has been corrected so as to remain within a predetermined pressure window 150.

Figure 3:
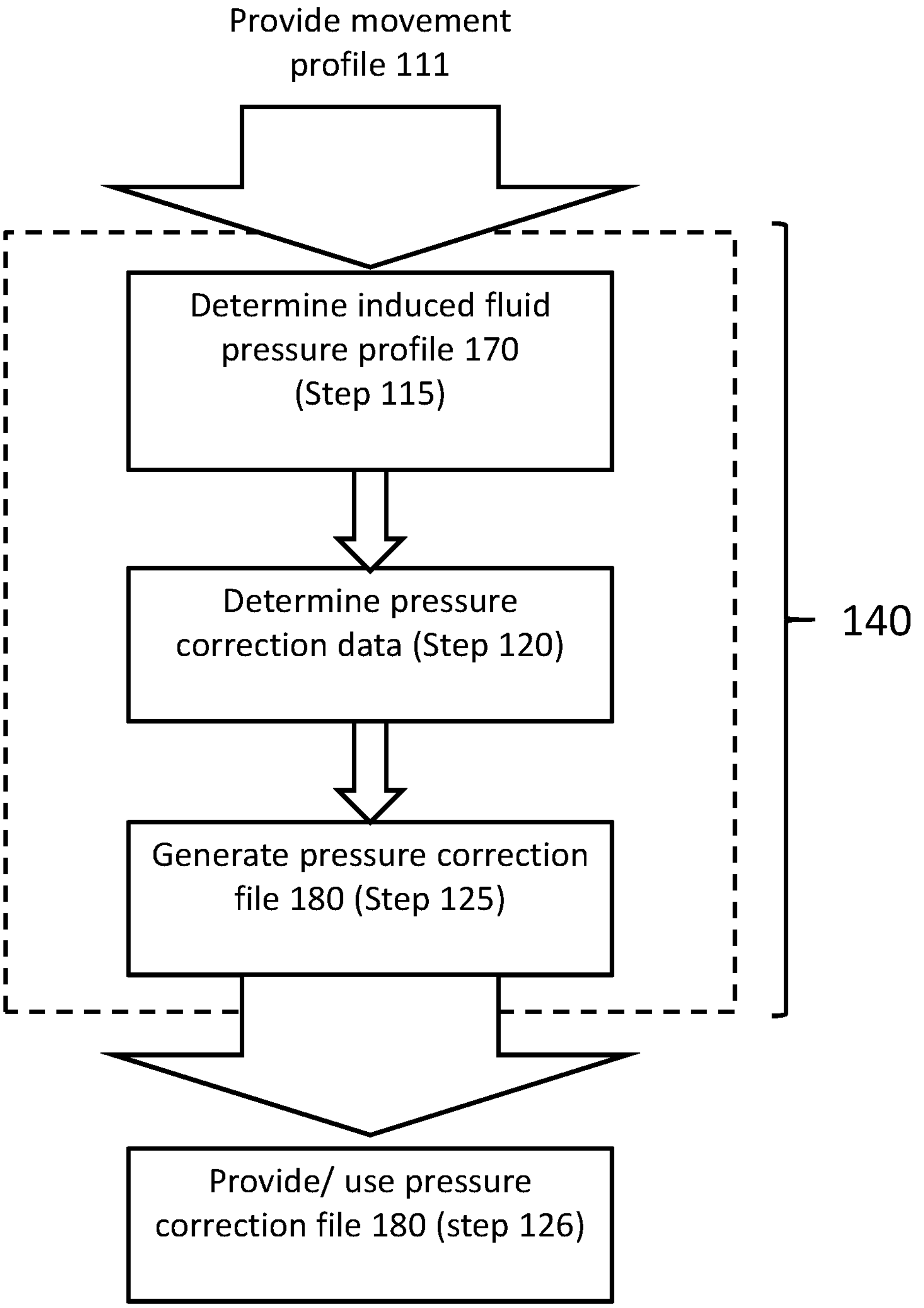
FIG. 3 depicts process steps for the sub-controller of FIG. 1.

As previously described, whilst methods exist to adjust the fluid supply in response to measurements of induced pressure changes, in applications where the induced pressure is changing rapidly (due to changes in orientation and/or position and/or velocity) such methods may be too slow to respond and therefore unable to control the induced pressure sufficiently to maintain the pressure at the nozzle plate 61 within the predetermined pressure window 150 so as to prevent weeping/air ingestion or undesirable variations in droplet size and velocity, and hence print quality/appearance. The present application describes a method of compensating for some/all induced pressure changes by determining (predicting) them in advance of executing the print strategy and then using the predicted induced pressure changes and the predetermined pressure window 150 to calculate a desired pressure compensation regime. An apparatus such as that depicted in FIG. 1 can then be used, when printing, so that the control device 10 adjusts the pressure in the fluid supply 46 over time, as the print strategy is executed and as the printing progresses, to compensate for the predicted pressure changes. This can be done, for example as shown in FIG. 3, which depicts a series of process steps 140 that may be performed in the sub-controller 20 when it is provided with the movement profile 111, for example from the processor 35. So that if a droplet ejection head movement profile 111 is provided to the sub-controller 20 by the processor 35 the sub-controller 20 is then configured to:

determine an induced fluid pressure profile 170 (step 115) at a predetermined location 51 for the droplet ejection head 60 using the droplet ejection head movement profile 111; and determine pressure correction data (step 120) for the droplet ejection head 60 based on the induced fluid pressure profile 170 and a predetermined pressure window 150 to be maintained at the droplet ejection head 60.

The sub-controller 20 is then configured to generate a pressure correction file 180 (step 125) for the droplet ejection head 60 and then to provide the pressure correction file 180 to an external device, or to use the pressure correction file 180 to directly control the control device 10 (step 126), or to supply the pressure correction file to the control device 10, which may have internal controllers, so as to adjust and control the pressure in the fluid supply 46 over time. Locating the sub-controller 20 in close proximity to the control device 10 may be desirable to ensure that communications sent to/from the control device are conveyed and received in short time-scales.

It may be understood that the predetermined pressure window 150 may be the meniscus pressure window, whereby the upper limit is the pressure for which the nozzle plate 61 starts to wet (Pm=0 mbar) and the lower limit is the pressure at which air is ingested through the nozzles. These limits depend on a variety of factors, such as the type of droplet ejection head being used, the nozzle size and shape (nozzle layout), and the properties of the fluid being used. It may also be understood that a predetermined pressure window 150 narrower than the meniscus pressure window may be used if, for example, pressure fluctuations within the meniscus pressure window are significant enough to lead to undesirable variations in droplet size and velocity and hence the print appearance.

Figure 11A:
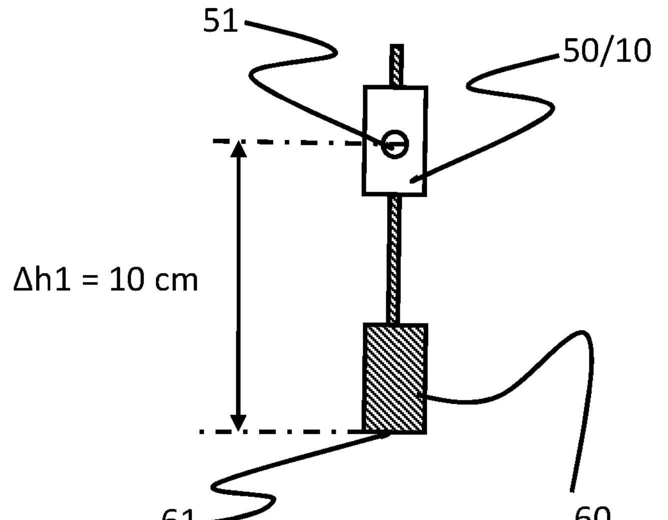
FIG. 11*a* depicts a droplet ejection head and sensor/controller oriented vertically.
Figure 11B:
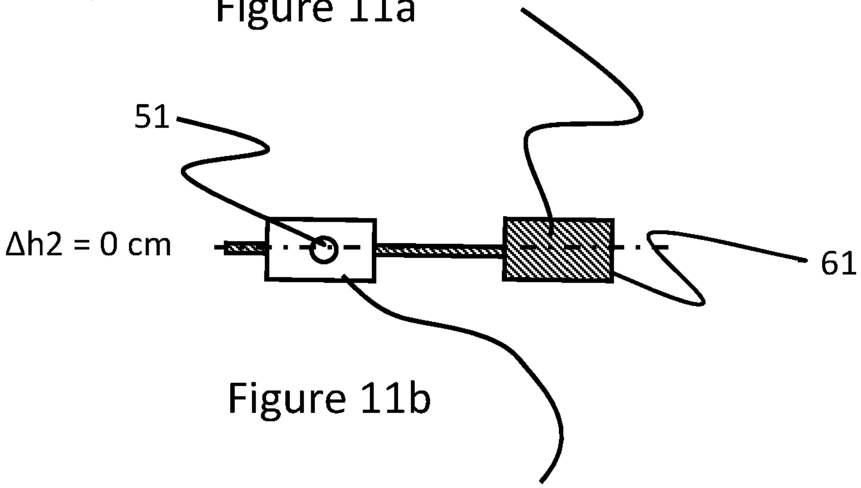
FIG. 11*b* depicts a droplet ejection head and sensor/controller oriented horizontally.
Figure 11C:
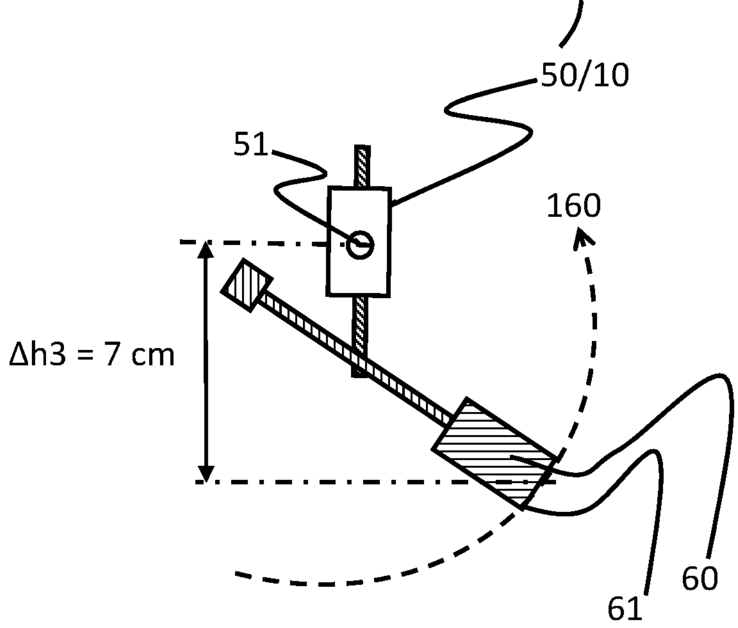
FIG. 11*c* depicts a droplet ejection head rotating independently of the sensor/controller.

It may further be understood that the predetermined location 51 is the position at which the control will be applied to adjust the fluid pressure so as to maintain the predetermined pressure window 150 at the droplet ejection head 60. It may further be understood that depending on where and how such control is to be applied, the predetermined location 51 may be at a fixed location or may be at a moving position. For example, the control device 10 may be located on a movement device 70 and move with the droplet ejection head 60, or the two may move independently of each other, or only the droplet ejection head may move whilst the control device's position is fixed. However, as previously explained, with reference to FIGS. 11*a*-11*c*, it is the relative movement and hence the height of the fluid column Δh between the predetermined location 51 and the nozzle plate 61 that is of importance when determining the induced pressure 170.

It may be understood that there are a number of ways in which the pressure correction data may be determined, for example the sub-controller 20 may perform a calculation to generate the pressure correction data. This may be calculated using the laws of physics; alternatively the sub-controller 20 may use a look-up table or may have a comparator to generate said respective pressure correction data. The comparator may compare the determined induced fluid pressure with the predetermined or pre-stored induced pressure and based on the comparison, output the pressure correction data. Further, where the sub-controller uses a look-up table, this may be pre-determined and encoded into the sub-controller 20, or provided to the sub-controller with the movement profile 111. Alternatively the sub-controller 20 may use a pre-calibration process to generate the induced pressure profile 170 and/or the pressure correction data, for example the apparatus may be used to perform calibration sweep(s) to generate a look-up table, or the apparatus may be used to trace the droplet ejection head path using the movement profile 111 so as to measure and record the induced pressure profile 170, compare that with the predetermined induced pressure profile and from this the pressure correction data can be calculated or determined. As an example one or more pressure sensors 50 may be moved along the path the droplet ejection head(s) will take and the pressure variations measured. It may be understood that when using one or more pressure sensors 50 in this manner to perform such calibration sweeps, the sensors must be integrated in such a way that the measured pressure represents the pressure in the nozzle(s). Alternatively, any other suitable method may be used to determine the pressure correction data. The pressure correction data may then be used to generate a pressure correction file 180 and the sub-controller 20 may be further configured to control the control device 10 located at the predetermined location 51 using the pressure correction file 180 so as to dynamically adjust the fluid pressure in part or all of the fluid supply system 40 in order to maintain the predetermined pressure window 150 at the droplet ejection head 60 when the droplet ejection head 60 and the control device 10 are fluidically connected to the fluid supply 46.

Figure 4:
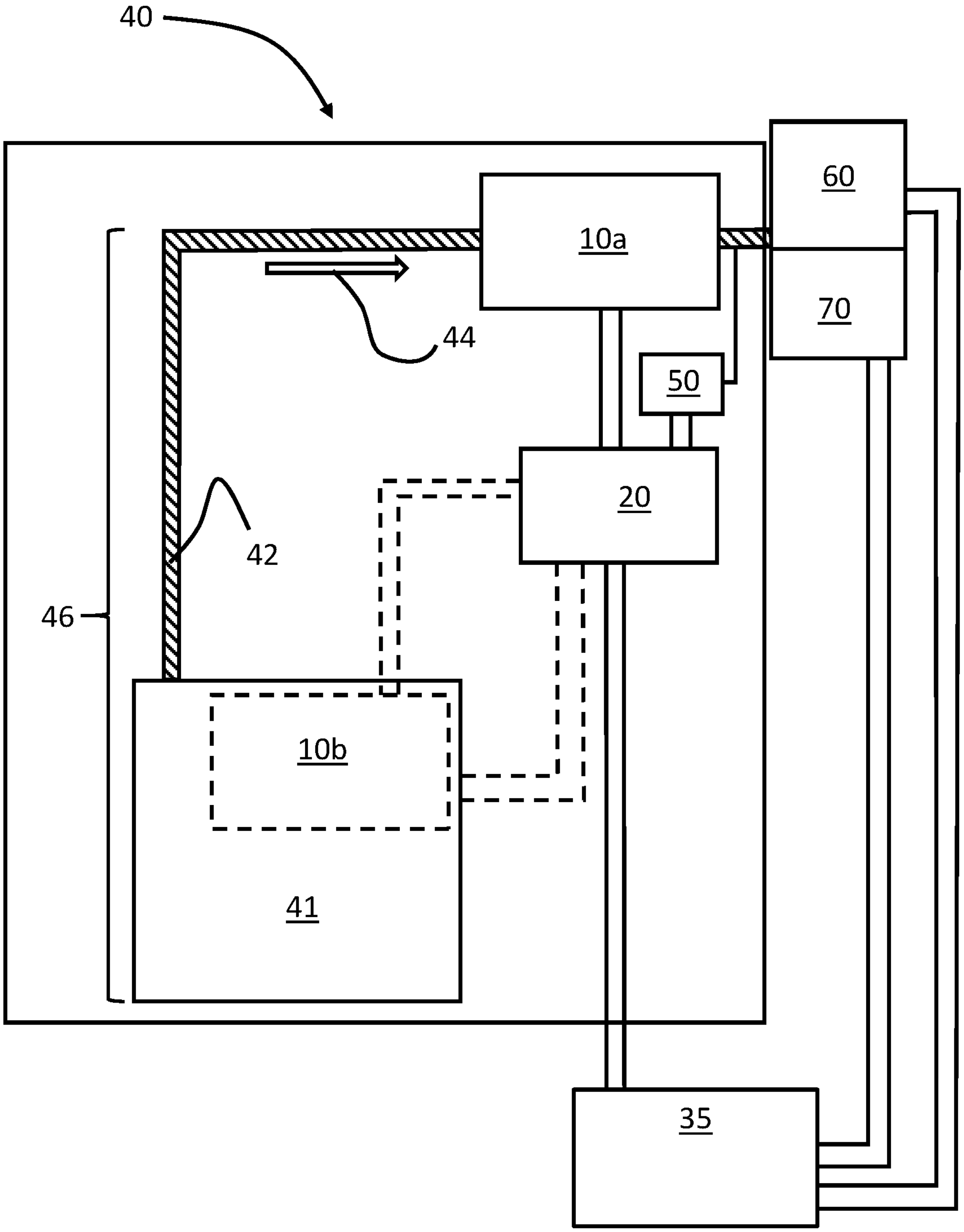
FIG. 4 depicts a processor, a fluid supply system, a movement device and a droplet ejection head similar to that in FIG. 1 and further comprising a control device in the fluid reservoir and a pressure sensor.
Figure 5:
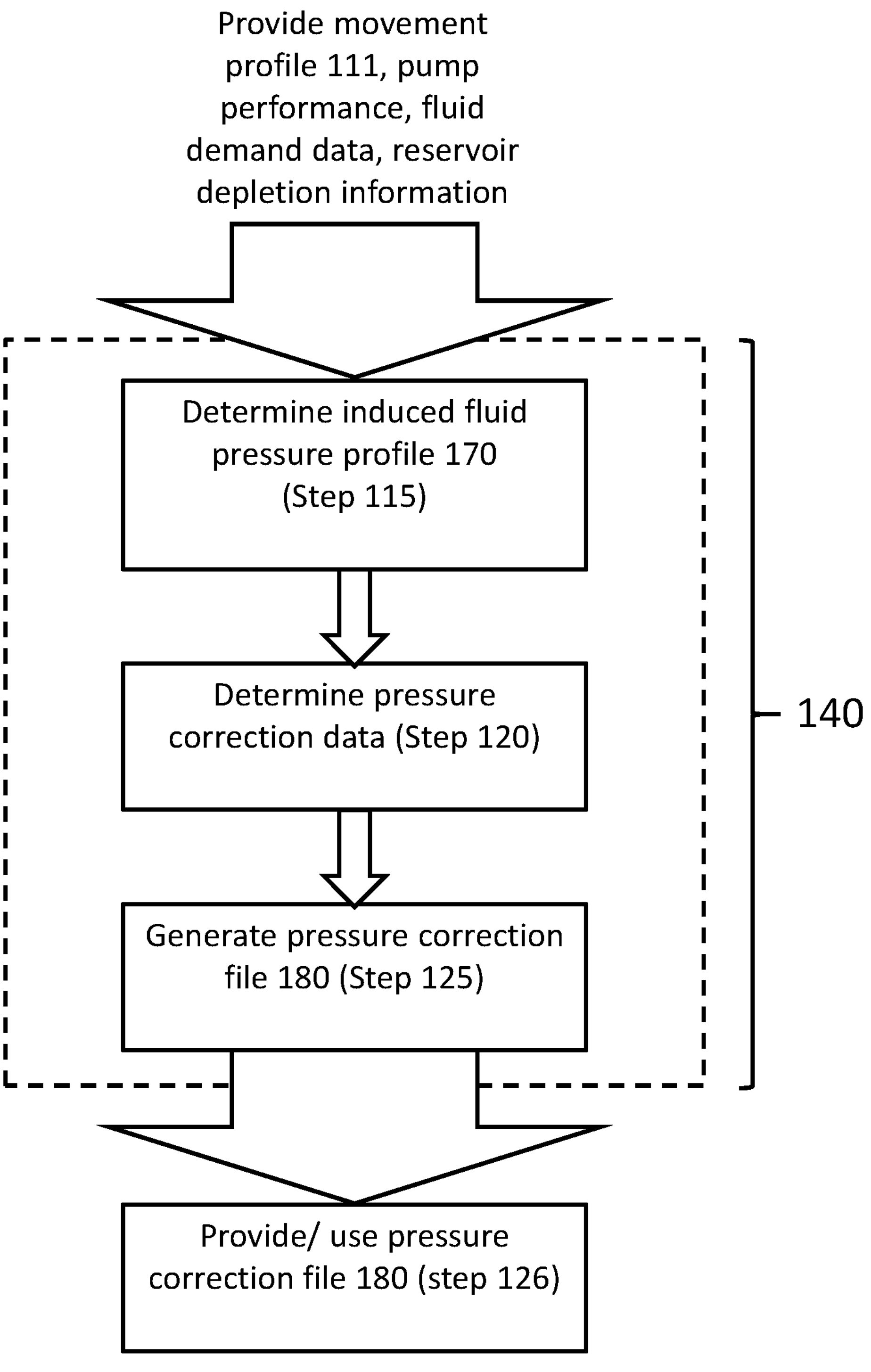
FIG. 5 depicts process steps for the sub-controller of FIG. 4.

It may be understood that in many implementations, it may be convenient to locate the control device 10 close to the droplet ejection head 60. However, in other implementations, it may be suitable to locate a control device 10*b* in the fluid reservoir 41 as depicted with dotted lines in FIG. 4; still further, in some implementations more than one control device 10 may be desirable, as depicted in FIG. 4. For example, in FIG. 4 at least one of the control devices is either located adjacent to and fluidically connected to the fluid reservoir 41, or located within the fluid reservoir 41 and at least one of the control devices 10 is fluidically connected to the fluid supply path 42. Further at least one of the control devices 10 is located adjacent to and fluidically connected to the second end of the fluid supply path 42. More than one control device 10 may be desirable, for example, when the pressure correction data may be split into global and local data, such that slower changes in height of the droplet ejection head, which may be compensated for globally by adjusting the pressure of the fluid in the fluid supply 46 by controlling the fluid in the fluid reservoir 41 whilst more rapid changes (for example in orientation of the printhead at a given height) are controlled locally using a control device 10 located in close proximity to the droplet deposition head 60. In such circumstances, the pressure correction file 180 may then be two pressure correction files 180, one for each control device 10. It should further be understood that there may be other sources of pressure variations in the fluid supply system 40, some of which may also be predictable/calculable/measurable/calibrated for in advance, such as changes in fluid demand as the print load or print duty varies, or variations due to depletion of the fluid reservoir 41 causing hydrostatic pressure variations or the known performance of a pump or pumps in the fluid supply system 40, pressure variations due to pipe length, or viscous damping, etc. The process steps in such cases may be similar to those depicted in FIG. 5, which are similar to those of FIG. 3, except that additional information such as pump performance, fluid demand data, reservoir depletion information, is provided to the sub-controller 20 so as to determine more induced pressure changes 170 and generate a pressure correction file or files 180 that compensate for more factors.

FIG. 4 also depicts a fluid supply system 40 further comprising a pressure sensor 50 located in proximity to the droplet ejection head 60 so as to measure the pressure at or adjacent to the predetermined location adjacent to the droplet ejection head 60. Furthermore, the sensor 50 is in communication with the sub-controller 20 so as to provide pressure measurements thereto. Further it may be understood that where the sensor 50 measures the pressure at a location adjacent to but not at the predetermined location, the sensor, or the sub-controller 20/controller 30 to which it provides the pressure measurement may adjust the pressure measurement to account for the difference in location. It may be understood that there may be more than one sensor 50 in the fluid supply system 40, for example there may be one adjacent to every control device 10 present in the system, or (where applicable) adjacent to every droplet ejection head 60. In other words, the pressure sensor(s) 50 is/are connected to and controlled by the sub-controller 20 so that the sub-controller 20 is configured to receive one or more pressure measurements of the pressure in the fluid supply path 42 that are measured at or in close proximity to the predetermined location(s) 51. Such sensor(s) 50 may provide a check that the control device(s) 10 is/are performing as expected and adjusting the fluid pressure as desired. Alternatively, the sensor(s) 50 may also detect unpredictable pressure fluctuations in the fluid supply system 40. These might be due to noise or vibrations from the environment in which the system is operating, or similar from the movement device, or any other source of unpredictable pressure fluctuations. In some implementations, it may be desirable to have a system which can adjust for both the predictable induced pressure variations and the unpredictable pressure fluctuations, accordingly the sub-controller 20 may be further configured to determine one or more responsive pressure corrections based on said at least one or more pressure fluctuation measurements, said predetermined pressure window 150, and/or the respective pressure correction data. The sub-controller 20 may then be further configured to control one or more of the control devices 10 using the responsive pressure correction so as to dynamically adjust the fluid pressure in part or all of the fluid supply system 40 in order to maintain the predetermined pressure window 150 at the droplet ejection head 60. Using a sub-controller 20 located in the fluid supply system 40 may be desirable in such a scenario to ensure fast responses to any measured pressure fluctuations.

Figure 6:
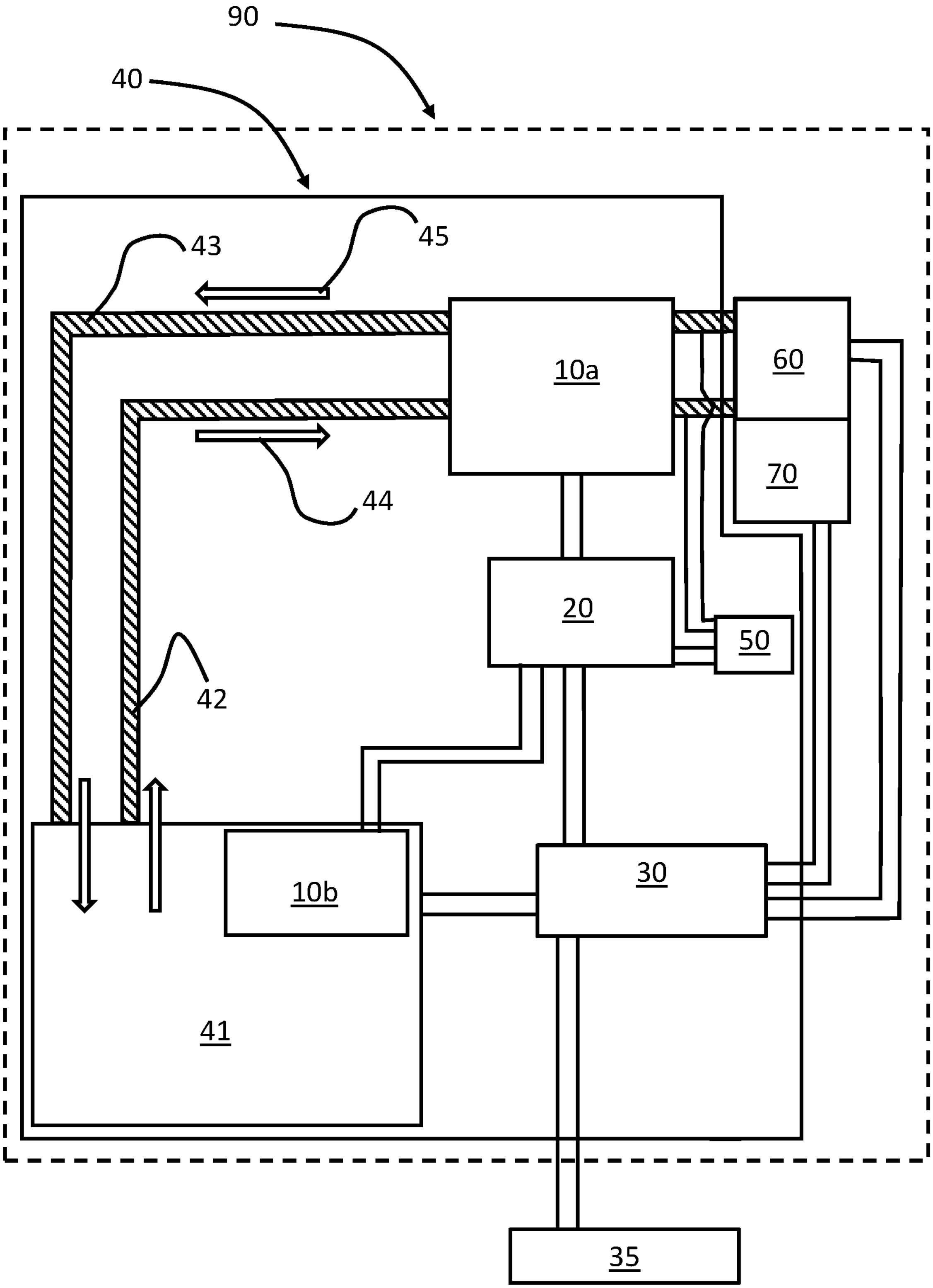
FIG. 6 depicts a through-flow enabled fluid supply system comprising control devices, a sensor, a sub-controller and a master controller and the through-flow enabled fluid supply system connected to a droplet ejection head.

Turning now to FIG. 6, this depicts a processor 35 and an apparatus 90 for printing comprising a fluid supply system 40 similar to those previously described, a droplet ejection head 60 connected to the fluid supply system 40 at a second end of the fluid supply path 42 and a movement device 70 upon which the droplet ejection head 60 is mounted. The main differences to previously described arrangements are that FIG. 6 depicts a through-flow system, which is a fluid supply system 40 comprising one or more fluid supply paths 42 and one or more fluid return paths 43 such that a fluid return path 43 is connected to the fluid reservoir 41 at its first end and to the droplet ejection head 60 at its second end. Through-flow means that the fluid circulates around the fluid supply system 40 and through the droplet ejection head 60 with a proportion of the fluid being drawn off and ejected out of the nozzles in the droplet ejection head 60 and the remainder being returned to the fluid reservoir 41 as indicated by the return flow arrow 45. Further it can be seen that the control device 10*a*, located adjacent to the droplet ejection head 60, is configured so as to control the fluid pressure in either the fluid supply path 42 and/or the fluid return path 43 such that at least one of the control devices is located adjacent to a second end of one of said one or more fluid return paths. Such that the first ends of the fluid return paths are located at the fluid reservoir 41 and the second ends are adjacent to the droplet ejection heads 60.

FIG. 6 differs further from previously described arrangements in that the fluid supply system 40 comprises a controller 30 as well as the sub-controller 20. It may be understood that the controller 30 in FIG. 6 performs some of the steps that in previously described arrangements would have been performed in the processor 35. So, for example, in FIG. 6 the controller 30 is a processor controlled controller 30 configured to control a printing process comprising controlling the fluid pressure in the droplet ejection head 60; wherein the controller 30 is configured to:

receive a printing strategy from the processor 35; and calculate a droplet ejection head movement profile 111 for the droplet ejection head 60 using the printing strategy.

Figure 7:
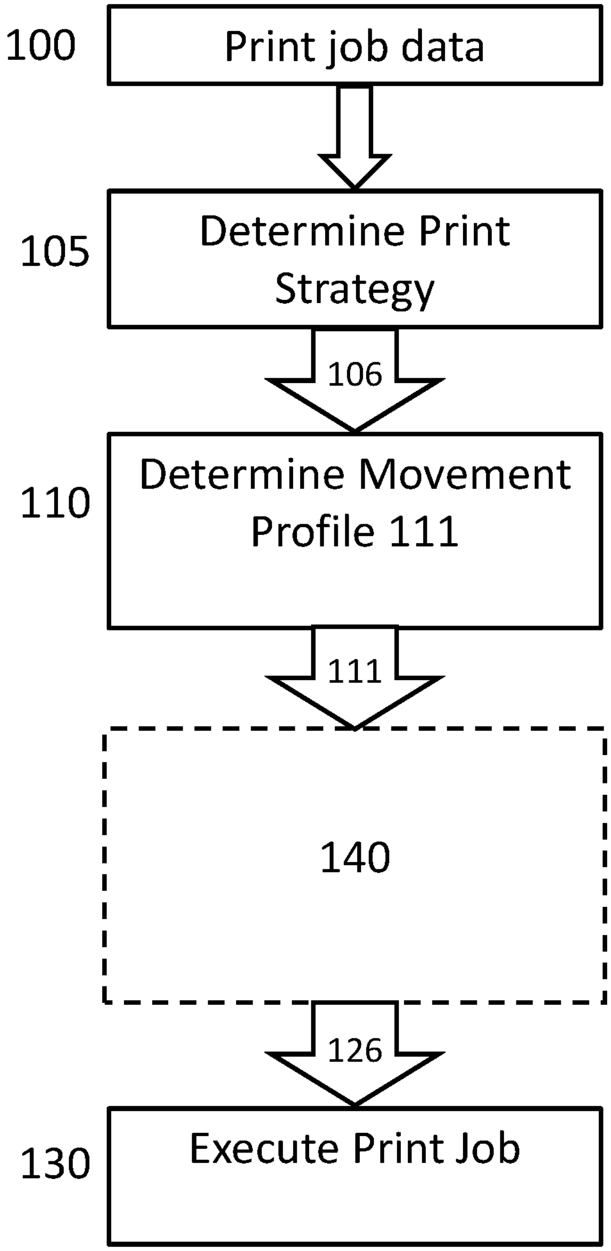
FIG. 7 depicts process steps for the controller of FIG. 6.

The controller 30 is then configured to send the droplet ejection head movement profile 111 to a sub-controller 20 which may be substantially as described herein. FIG. 7 depicts the main steps in the process:

step 100—receive the print job data;

step 105—use the print job data to determine the print strategy 106;

step 110—determine the movement profile 111;

perform step 140 (as previously described with reference to FIG. 3) to determine the pressure correction file 126; and step 130—execute the print job.

In the apparatus 90 of FIG. 6, the controller 30 sends the movement profile to the sub-controller 20 to perform step 140. Once the pressure correction file 126 has been determined by the sub-controller 20, the controller 30 then executes the print job. This means that the controller 30 may be further configured to control the movement device 70 so as to move the droplet ejection head 60 in accordance with the droplet ejection head movement profile 111 and also the printing strategy may comprise printing commands and the controller 30 may be further configured to control the droplet ejection head 60 so as to execute the printing commands. Still further the printing strategy may comprise fluid requirements and the controller 30 may be further configured to control the fluid supply system 40 and/or the fluid reservoir 41 so as to meet the fluid requirements. It may be understood that the above-described process is one particular division of the required tasks or steps and that in other embodiments, the balance of tasks may be distributed differently between the processor 35, controller 30 and sub-controller 20.

Figure 8:
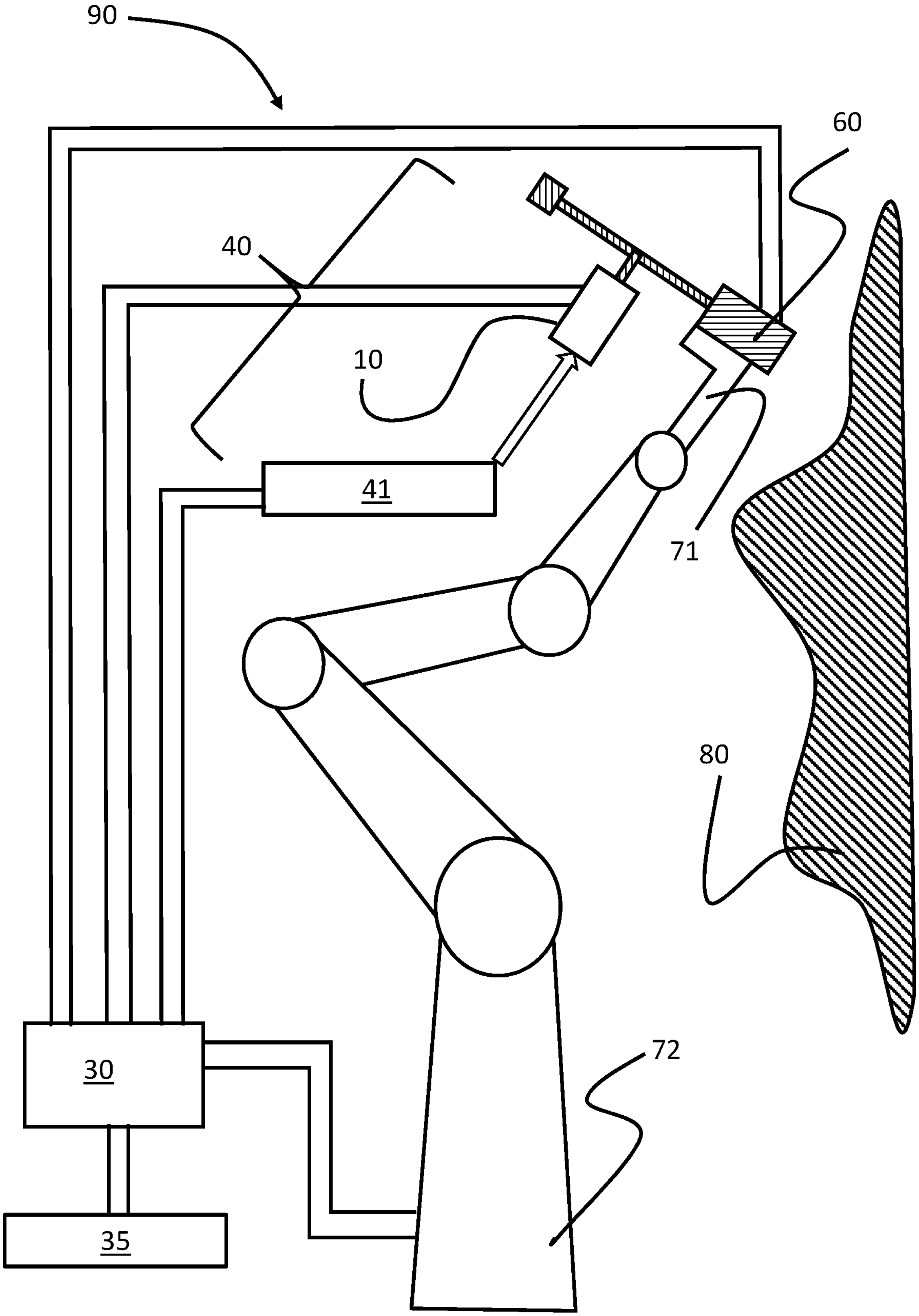
FIG. 8 depicts an apparatus addressing a 3D body, wherein the apparatus comprises a fluid supply system, a movement device and a droplet ejection head connected to the fluid supply system and mounted on the movement device.

Considering now FIG. 8, this depicts a processor 35 and an apparatus 90. The apparatus 90 is similar to that described in FIG. 6. For simplicity the fluid supply system is depicted in simplified form with an arrow indicating the fluid supply path. In this arrangement, the movement device 70 is shown schematically as a robotic arm 72 where the droplet deposition head 60 is arranged on a mount 71 on a robotic arm 72 and is shown addressing a 3D body 80. It can be seen that the use of the robotic arm 72 allows the droplet ejection head to address the bumps and contours on the surface or non-planar surfaces of the 3D body 80. Thus the apparatus 90 comprises a movement device 70 configured to be movable in three or more directions and/or orientations, further, the movement device 70 is a robotic arm 72 with a plurality of degrees of freedom. It may be understood that the movement device 70 may be any suitable device or mechanism with a plurality of degrees of freedom. The main difference from the arrangement depicted in FIG. 6 is that in the arrangement in FIG. 8 the sub-controller 20 has been omitted and the controller 30 has been configured to incorporate the functionality of a sub-controller 20. It may be understood that according to the requirements of a particular implementation a fluid supply system 40 may comprise one or more control devices 10 located at one or more predetermined locations 51 and the control devices 10 may be in communication with a sub-controller 20 and/or a controller 30.

Figure 9:
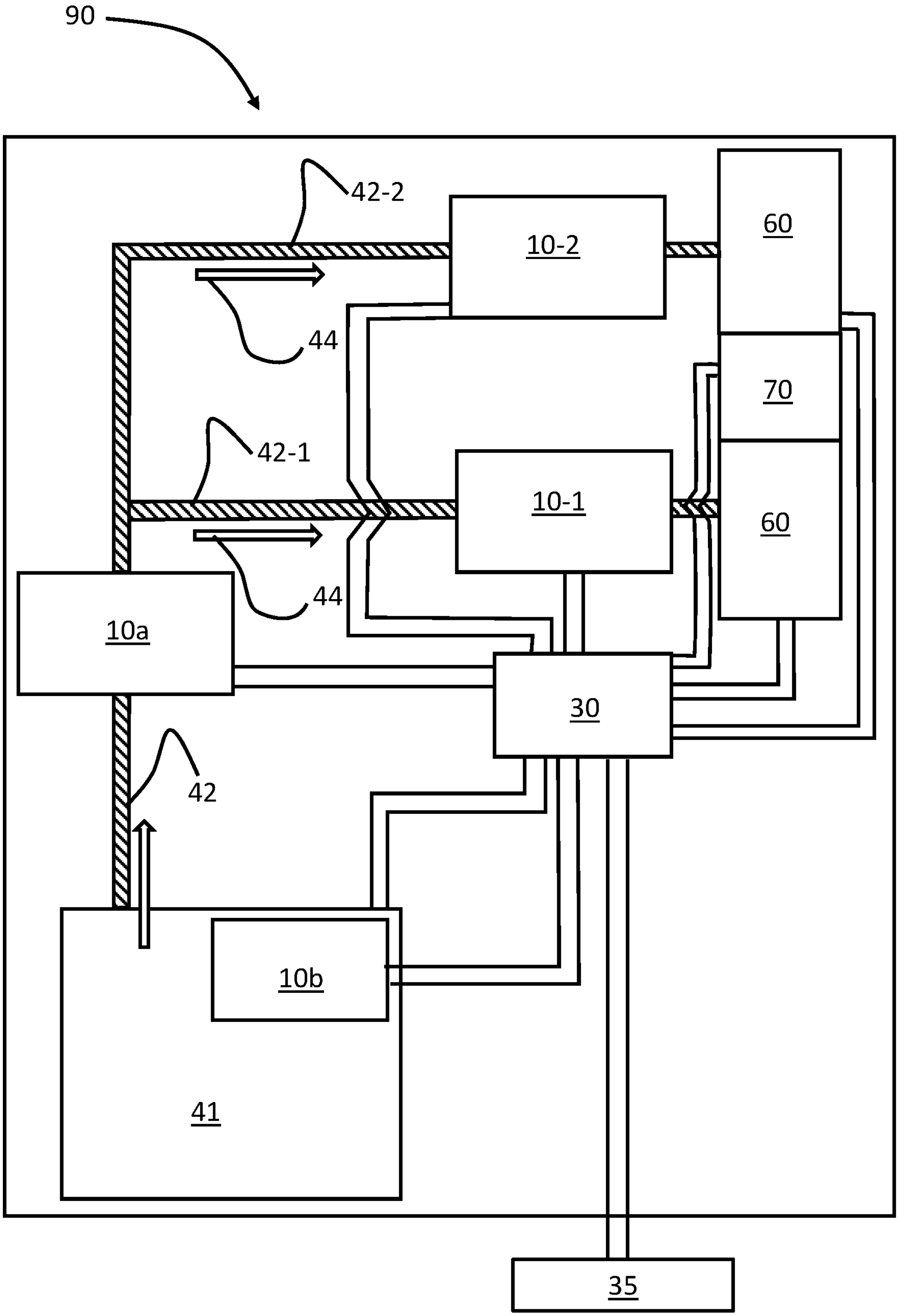
FIG. 9 depicts a fluid supply system comprising control devices, a master controller and the fluid supply system connected to a droplet ejection head.
Figure 10A:
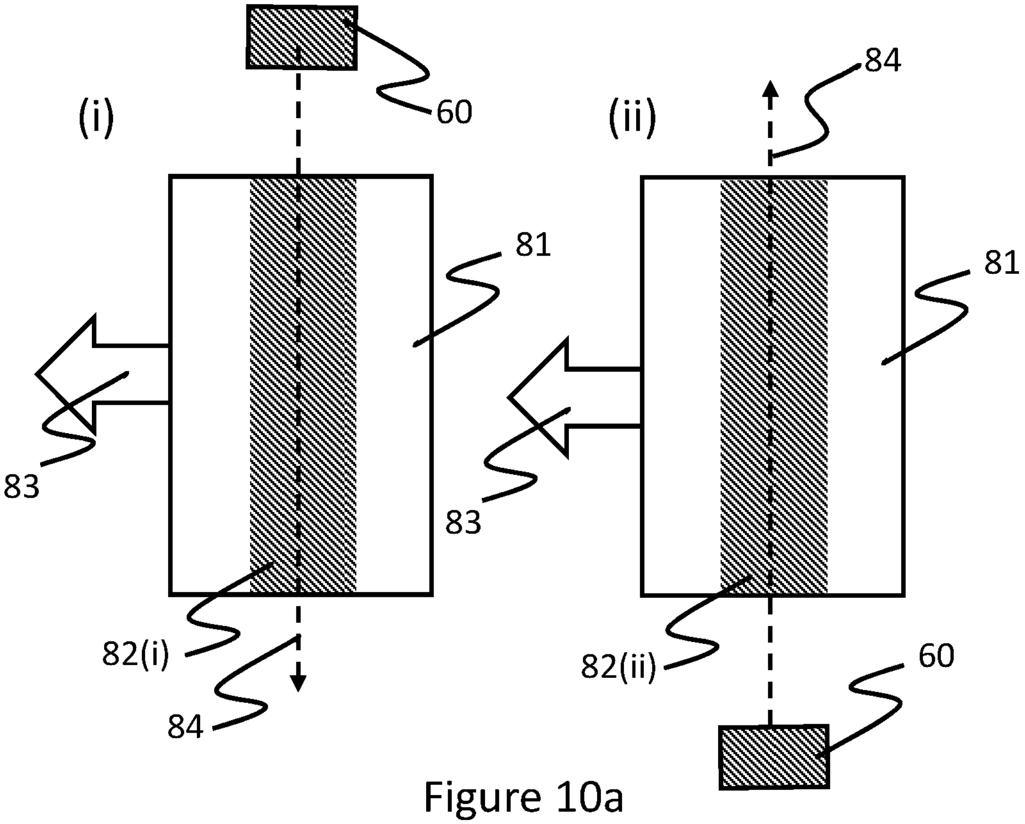
FIG. 10*a* depicts printing onto a moving substrate using a moving droplet ejection head.
Figure 10B:
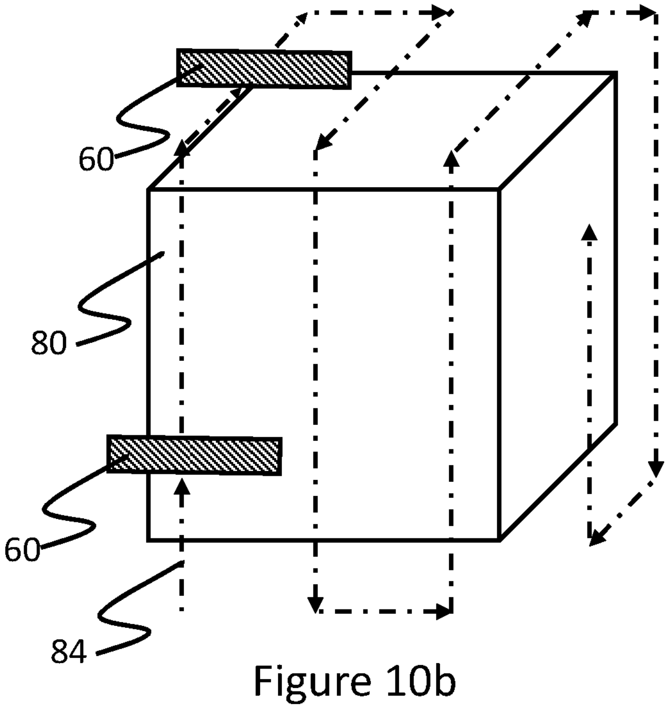
FIG. 10*b* depicts printing onto a 3D object using a moving droplet ejection head.

Turning now to FIG. 9, this depicts a similar arrangement to previous Figures; comprising an apparatus 90 and a processor 35. The apparatus 90 comprises similar features to previous implementations, but instead of one droplet ejection head 60 there are two, both mounted on the same movement device 70. It may be understood that in other implementations, there may be a plurality of droplet ejection heads 60, which may all be mounted on the same movement device 70, or there may be one droplet ejection head 60 per movement device 70 or robotic arm 72, or any other arrangement of rows or arrays of droplet ejection heads 60 mounted on one or more movement devices 70, including a plurality of droplet ejection heads 60 and a plurality of movement devices 70 where there is more than one droplet ejection head 60 per movement device 70. As for FIG. 8, FIG. 9 has a controller 30 but no sub-controller 20, so that the controller 30 will comprise the functionality of the sub-controller 20. The controller may also comprise further functionality. For example, the controller 30 in FIG. 9 is in communication with, so as to control, the droplet ejection heads 60, the movement device 70, and the fluid supply 41 which incorporates a control device 10*b*. There are also three further control devices, one (10*a*) located adjacent to the point at which the fluid supply path 42 splits into two sub-paths 42-1 and 42-2 and one (10-1, 10-2) located adjacent to each droplet ejection head 60 where each of the two sub-paths 42-1, 42-2 is connected at their respective second ends to the droplet ejection head 60. It may be understood that the fluid supply path 42 may be similarly divided into more sub-paths if there are more than two droplet ejection heads 60, or that a separate fluid supply path 42*a, b, c* . . . n may be provided per droplet ejection head 60 or per group of droplet ejection heads 60, with similar fluid supply path split points in the latter such that each droplet ejection head 60 is connected to the fluid supply system 40 and is supplied with the fluid. Accordingly, the fluid supply system 40 may comprise a plurality of fluid supply paths 42 and a plurality of control devices 10. FIG. 9 depicts a control device (10-1 and 10-2) per droplet ejection head 60, though it may be understood that a 1:1 relationship may not be required, and a single control device 10 may, for example, control several droplet ejection heads 60, for example if they are closely grouped, and/or in a fixed positional relationship between droplet ejection heads 60. The one or more control devices 10 may be configured to be controllable so as to dynamically adjust the fluid pressure within a part or all of the fluid supply system 40 when in operation; wherein said control devices 10 may be controlled by a controller 30, as in FIG. 9, or by a sub-controller as depicted in other implementations.

The arrangements and implementations as described herein may be used with a method of printing onto a vertical or non-planar or three-dimensional surface or onto a complex shape such as a three-dimensional shape or body. Such a method may use one or more droplet ejection heads 60 fluidically connected to a fluid supply system 40 as described herein; wherein said method comprises the steps of:

- receiving one or more droplet ejection head movement profiles 111;
- determining a respective induced fluid pressure profile at one or more predetermined locations for each of said one or more droplet ejection heads using the respective droplet ejection head movement profiles 111;
- generating pressure correction data at said one or more predetermined locations based on said induced fluid pressure profile and a predetermined pressure window.

The predetermined pressure window may depend on the droplet ejection head being used, the fluid being used, distance and/or angle between the fluid supply system 40 and the droplet ejection head 60, fluid supply pipe diameter and any other components that the fluid supply system 40 may comprise, further, the predetermined pressure window may be the meniscus pressure window or a (possibly narrower) pressure range so as to optimise the print performance. The method of printing may further comprise controlling the fluid pressure within the fluid supply system 40 during operation and thereby maintaining a predetermined pressure window 150 at said one or more droplet ejection heads 60 whilst receiving printing commands and executing said printing commands such that the droplet ejection head (or heads) 60 print the image onto the substrate whilst moving the one or more droplet ejection heads 60 according to the droplet ejection head 60 movement profile 111.

It may be understood that where there are other, predictable pressure variations in the fluid supply system 40, the generation of the pressure correction data may therefore further comprise adjusting for further predictable pressure variations in the fluid supply system 40. Depending on the implementation, one or more ways of calculating the pressure correction data may be implemented, for example the method of printing may comprise one or more of the following:

- generating the pressure correction data comprises performing a calculation, for example using a formula and/or the laws of physics;
- generating the pressure correction data comprises using a lookup table;
- generating the pressure correction data comprises using a comparator;
- generating the pressure correction data comprises performing a pre-printing calibration process.

Once the pressure correction data has been determined, the method of printing may comprise controlling the fluid pressure within the fluid supply system 40 during operation by dynamically adjusting the pressure in the fluid supply system 40 using one or more control devices 10 and the pressure correction data, which may be provided as a pressure correction file.

The method of printing may further comprise sensing the pressure in the fluid supply system 40 at one or more locations, for example, at the one or more predetermined locations 51, using one or more sensors 50. This may be performed as a check that the control devices are correcting the induced pressure in the fluid supply system correctly, or, the sensors may additionally/instead be used to measure unpredictable pressure fluctuations in the fluid supply system 40, for example due to environmentally-induced vibrations, or vibrations from component parts of the apparatus 90. The method of printing may therefore further comprise adjusting the pressure in the fluid supply system 40 if there is a difference between the sensed pressure and the predetermined pressure window.

It may be understood that in order to determine the movement profile 111, the printing strategy may need to be determined; this may be calculated/defined in the processor 35. For example, the method of printing may involve determining or receiving the print job data, and using the print job data such that determining the printing strategy comprises using one or more of the printing grid, the print resolution, the swath profile, number of layers, and stitching. Having determined what is to be printed, and where, the method of printing further comprises determining the printing strategy wherein determining the printing strategy comprises calculating a droplet ejection head movement profile 111 for the one or more droplet ejection heads 60. It may be understood that such calculations may comprise calculating the droplet ejection head path, the droplet ejection head velocity, the droplet ejection head acceleration or deceleration and/or the droplet ejection head orientation. Determining the printing strategy may also comprise determining printing commands and fluid requirements.

The controller and/or sub-controller may be a computing device, a microprocessor, an application-specific integrated circuit (ASIC), system on chip modules including processor elements and FPGA logic, or any other suitable device to control the functions of the various components of the fluid supply system and/or the droplet ejection head. The processor may be, for example, a microprocessor or a computer.

The invention claimed is:

1. A method of printing using a processor controlled controller to control fluid pressure in one or more droplet ejection heads fluidically connected to a fluid supply system including a fluid supply having a fluid reservoir and one or more fluid supply paths, said one or more fluid supply paths being connected to said fluid reservoir at a first end and being configured so as to connect to one or more droplet ejection heads at a second end, said method comprising the steps of:

receiving a printing strategy;

calculating a droplet ejection head movement profile for each of said one or more droplet ejection heads using the printing strategy, wherein the droplet ejection head movement profile includes an orientation of said one or more droplet ejection heads;

determining a respective induced fluid pressure profile at one or more predetermined locations for each of said one or more droplet ejection heads using the droplet ejection head movement profile;

generating respective pressure correction data based on the respective induced fluid pressure profile and a predetermined pressure window to be maintained at said one or more droplet ejection heads;

generating a respective pressure correction file for said one or more predetermined locations based on said pressure correction data;

controlling the fluid pressure within the fluid supply system during operation and thereby maintaining a predetermined pressure window; and wherein said fluid supply system further comprises one or more control devices located at said one or more predetermined locations and wherein said one or more control devices are in communication with said controller, and wherein said one or more control devices are configured to be controllable so as to dynamically adjust the fluid pressure within a part or all of the fluid supply system when in operation; wherein said control devices are controlled by said controller, wherein controlling the fluid pressure within the fluid supply system during operation comprises dynamically adjusting the pressure in the fluid supply system using said one or more control devices and said pressure correction file.

2. The method of printing according to claim 1, wherein generating said respective pressure correction file further comprises adjusting for further predictable pressure variations in said fluid supply system.

3. The method of printing according to claim 1, wherein generating said pressure correction data comprises performing a calculation and/or wherein generating said pressure correction data comprises using a lookup table and/or wherein generating said pressure correction data comprises using a comparator and/or wherein generating said induced fluid pressure profile and/or said respective pressure correction data comprises performing a pre-printing calibration process.

4. The method of printing according to claim 1, wherein said fluid supply system comprises one or more pressure sensors located so as to measure the pressure at said one or more predetermined locations in said fluid supply system and wherein said one or more sensors are in communication with said controller so as to provide pressure measurements thereto, wherein said method comprises sensing the pressure in the fluid supply system at said one or more predetermined locations and wherein said method further comprises adjusting the pressure in the fluid supply system if there is a difference between the sensed pressure and the predetermined pressure window.

5. The method of printing according to claim 1, wherein said method further comprises receiving printing commands and executing said printing commands and further comprises moving said one or more droplet ejection heads according to said droplet ejection head movement profile.

6. The method of printing according to claim 1, wherein calculating a droplet ejection head movement profile for each of said one or more droplet ejection heads comprises one or more of: calculating the droplet ejection head path and/or the droplet ejection head velocity and/or the droplet ejection head acceleration or deceleration and/or the droplet ejection head orientation.

7. A method of printing using a processor controlled controller to control fluid pressure in one or more droplet ejection heads fluidically connected to a fluid supply system including a fluid supply having a fluid reservoir and one or more fluid supply paths, said one or more fluid supply paths being connected to said fluid reservoir at a first end and being configured so as to connect to one or more droplet ejection heads at a second end, said method comprising the steps of:

receiving a printing strategy;

calculating a droplet ejection head movement profile for each of said one or more droplet ejection heads using the printing strategy;

determining a respective induced fluid pressure profile at one or more predetermined locations for each of said one or more droplet ejection heads using the droplet ejection head movement profile;

generating respective pressure correction data based on the respective induced fluid pressure profile and a predetermined pressure window to be maintained at said one or more droplet ejection heads; and generating a respective pressure correction file for said one or more predetermined locations based on said pressure correction data;

controlling the fluid pressure within the fluid supply system during operation and thereby maintaining a predetermined pressure window; and wherein said fluid supply system further comprises one or more control devices located at said one or more predetermined locations and wherein said one or more control devices are in communication with said controller, and wherein said one or more control devices are configured to be controllable so as to dynamically adjust the fluid pressure within a part or all of the fluid supply system when in operation; wherein said control devices are controlled by said controller, wherein controlling the fluid pressure within the fluid supply system during the operation comprises dynamically adjusting the pressure in the fluid supply system using said one or more control devices and said pressure correction file.

* * * * *